Patented Apr. 2, 1929.

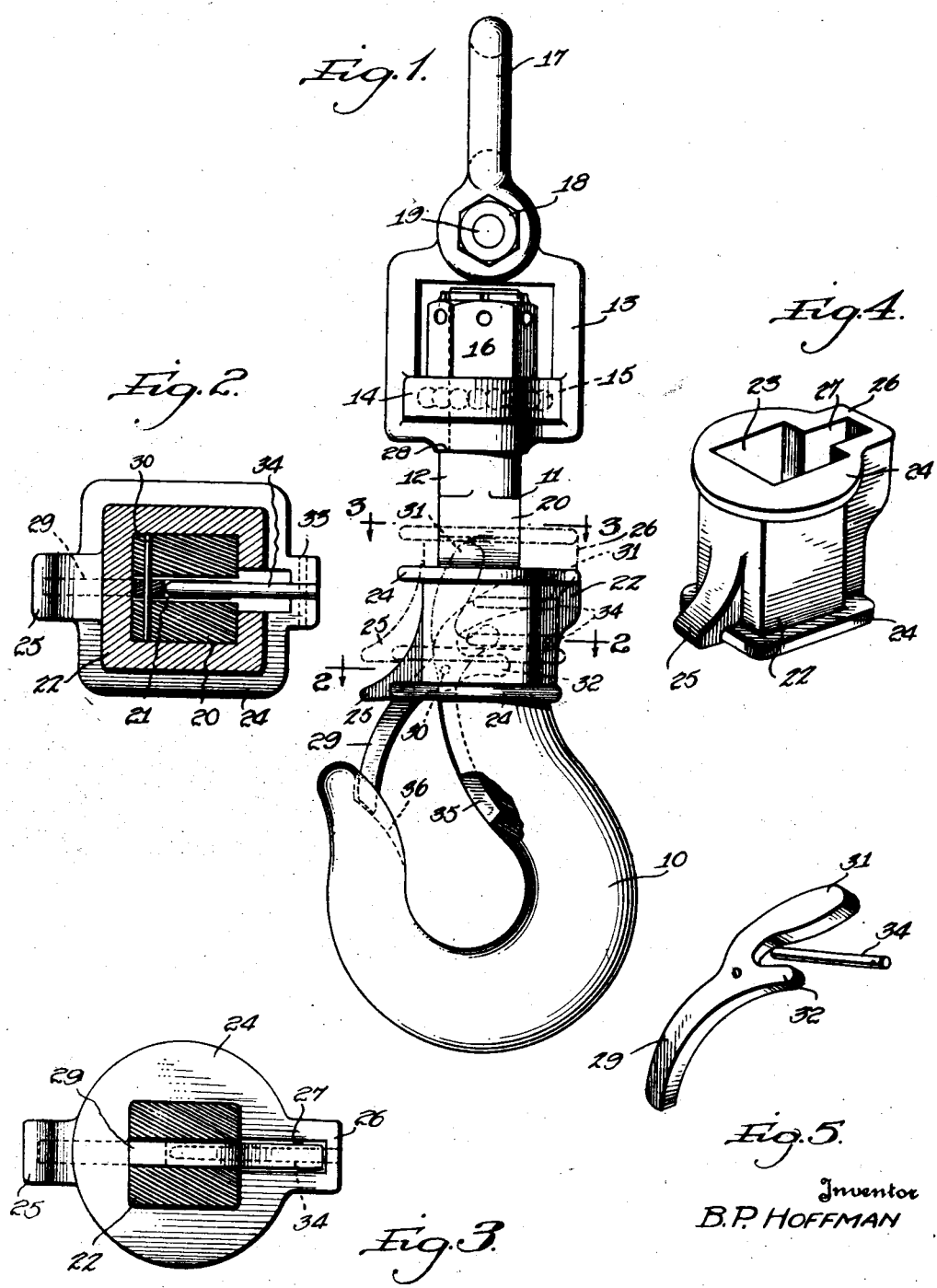

1,707,721

UNITED STATES PATENT OFFICE.

BENJAMIN P. HOFFMAN, OF TULSA, OKLAHOMA, ASSIGNOR TO PIERCE DEVELOPMENT COMPANY, OF TULSA, OKLAHOMA, A CORPORATION OF OKLAHOMA.

ELEVATOR HOOK.

Application filed May 9, 1928. Serial No. 276,404.

This invention relates to improvements in elevator hooks and more particularly to elevator hooks having swivelled clevises connected thereto and which are particularly adapted for use in lifting heavy objects such as rods, tubing, pipe or the like, from oil wells or similar excavations after the drilling process has been completed.

An important object of this invention is to provide a hook having a keeper adapted to close the entrance of the hook whereby objects carried by the hook will not become accidently disengaged therefrom.

Another object is to provide a hook having a sleeve slidable on the shank thereof, the sleeve carrying a cam member adapted to alternately move a keeper into and out of position across the entrance of the hook.

A further object is to provide a hook having a longitudinal groove in the forward portion thereof, the outer extremity of the keeper being receivable within the groove to effectively close the entrance to the hook.

Other objects and advantages of this invention will become apparent from the following description.

In the drawing I have shown a preferred embodiment of my invention. In this showing:

Figure 1 is a side elevation,

Figure 2 is a sectional view taken substantially on line 2—2 of Figure 1,

Figure 3 is a sectional view taken substantially on line 3—3 of Figure 1,

Figure 4 is a perspective view of the rider, and

Figure 5 is a perspective view of the keeper and cam member.

Referring to the drawing the numeral 10 designates a hook formed with a shank 11 having a cylindrical portion 12 adjacent its upper end, on which a clevis 13 is rotatably mounted. As shown, the clevis 13 is formed with an enlarged substantially cylindrical portion 14 adjacent its lower end and a pair of opposed raceways carrying ball bearings 15 are adapted to rotatably seat within the enlarged portion 14. The clevis 13 is adapted to abut against an annular shoulder 28 formed on the shank and the shank is held within the clevis by means of a lock nut 16 or the like, threaded on the upper end of the shank, and which is adapted to lightly bear against the outer surface of the upper raceway. It will be obvious that the clevis 13 may be freely rotated on the shank 11 so long as the nut 16 is not threaded tightly against the raceways carrying the ball bearings. A connecting member or link 17 is pivotally secured to the upper portion of the clevis by means of a nut 18 or the like, threaded on the shank of a bolt 19 extending through aligned apertures in the upper portion of the clevis and connecting member.

Adjacent its cylindrical portion the shank 11 is formed with a substantially rectangular portion 20. Assuming the side of the shank facing the bill of the hook to be the front, an elongated longitudinal aperture 21 extends through the rectangular portion 20, from the front to the rear, and substantially centrally thereof. A sleeve or rider 22, having a rectangular shaped portion 23 is adapted to be slidably mounted on the rectangular portion 20 of the shank. The sleeve 22 is formed with outstanding flanges 24 at its upper and lower extremities and the forward wall of the sleeve is provided with an outwardly extending substantially hollow portion or lip 25 for a purpose to be described. The rear wall of the sleeve is extended outwardly as shown at 26 and the extended portion is slotted substantially as shown at 27 for a purpose to be described.

Adjacent the lower extremity of the aperture 21 a keeper 29 is pivotally mounted on a pin 30, or the like, extending through opposite sides of the shank. The keeper 29 is provided with a pair of preferably integral angularly disposed finger members 31 and 32. Mounted in the rear wall of the sleeve 22, by means of the pin 33 or the like, is an elongated cam member 34 adapted to engage the fingers 31 and 32 of the keeper as will be hereinafter more fully understood. As shown, the hook is provided with a longitudinally extending groove 35 in its forward portion adjacent the aperture 21, and the lower portion of the keeper is adapted to seat within the groove 35. When the sleeve 22 is in the position shown in dotted lines in Figure 1 the keeper 29 is in position within the groove 35. If the sleeve is moved downwardly to the position shown in full lines in Figure 1 the cam member 34 will engage the lower finger member 32 of the keeper and force the keeper into position across the entrance of the hook. The keeper may then be returned to its position within the groove 35 by sliding the sleeve upwardly to its original position, whereupon the cam member 34 will engage the upper finger 31 of the keeper and return the keeper to its former position. When the keeper is in position across the entrance of the hook it is also possible to move the keeper out of this position by pressing thereagainst in the direction of the shank and the rider will be forced upwardly by the action of the lower finger 32 bearing against the cam member 34. The rider is of sufficient weight to immediately return the keeper to the position closing the entrance of the hook. Adjacent the bill of the hook a groove 36 is provided to receive the lower extremity of the keeper and to prevent movement of the keeper beyond the forward wall of said groove. When the keeper is in position closing the entrance of the hook, the upper finger 31 projects into the slot 27 in the rear wall of the sleeve and a portion of the keeper adjacent its pivot pin 30 lies within the hollow lip 25.

The entire device may be formed of any suitable material of sufficient strength to carry a heavy load, and the above described construction provides a hook capable of carrying heavy objects without danger of accidental disengagement of the object.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described, comprising a hook having a shank provided with an aperture therein, a closure member pivotally mounted within said aperture, a pair of relatively long angularly disposed fingers on the closure member, a sleeve slidably mounted on said shank, and an elongated member carried by said sleeve and extending into said aperture to alternately engage each finger member to move the closure member into and out of position across the entrance of the hook.

2. A device of the character described, comprising a hook having a longitudinal groove therein and a shank provided with an aperture therein, a closure member pivotally mounted within said aperture and adapted to seat within said groove, a pair of relatively long angularly disposed fingers on said closure member, and means slidably mounted on the shank to alternately engage each finger to move the closure member into and out of position across the entrance of the hook.

3. A device of the character described, comprising a hook having a longitudinal groove therein and a shank provided with an aperture therein, a closure member pivotally mounted within said aperture and adapted to seat in said groove, a pair of relatively long angularly disposed fingers on the closure member, a sleeve slidably mounted on said shank, and an elongated member carried by said sleeve and extending into said aperture to alternately engage each finger to move the closure member into and out of position across the entrance of the hook.

4. A device of the character described comprising a hook having a longitudinal groove therein and a shank provided with an aperture therein, said hook being further provided with a relatively small groove oppositely disposed from said first named groove, a closure member pivotally mounted within said aperture and adapted to seat in said first named groove, a pair of angularly disposed fingers on the closure member, a sleeve slidably mounted on said shank, and an elongated member carried by said sleeve and extending into said aperture to alternately engage each finger to move the closure member into and out of position across the entrance of the hook, the outer extremity of said closure member being receivable in said small groove to effectively close the entrance to the hook.

In testimony whereof I affix my signature.

BENJAMIN P. HOFFMAN.